Sept. 27, 1927.
C. D. HICKMAN
1,643,451
INTERIOR VALVE FOR RADIATORS
Filed Feb. 23, 1924     3 Sheets-Sheet 1
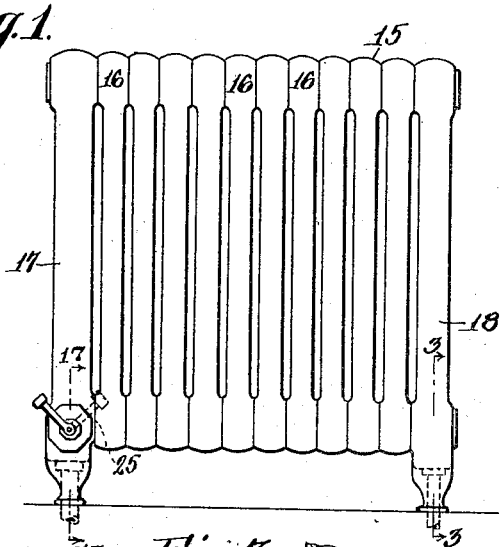
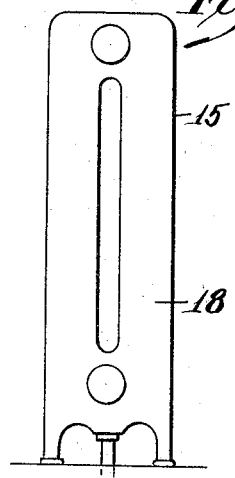
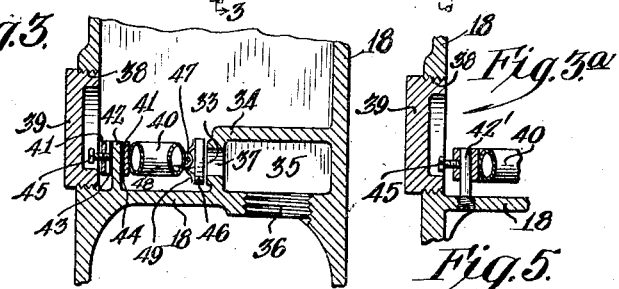
WITNESS:
INVENTOR
Charles D. Hickman
BY
ATTORNEY Sept. 27, 1927. 1,643,451
C. D. HICKMAN
INTERIOR VALVE FOR RADIATORS
Filed Feb. 23, 1924   3 Sheets-Sheet 2
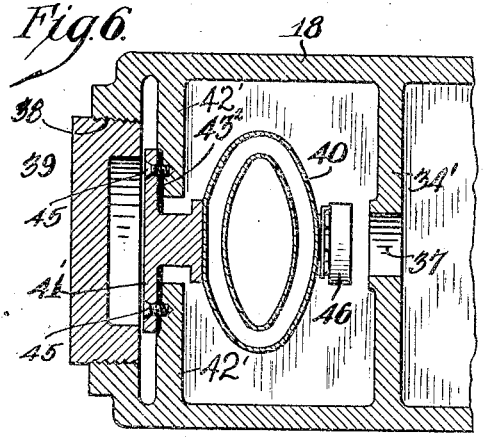
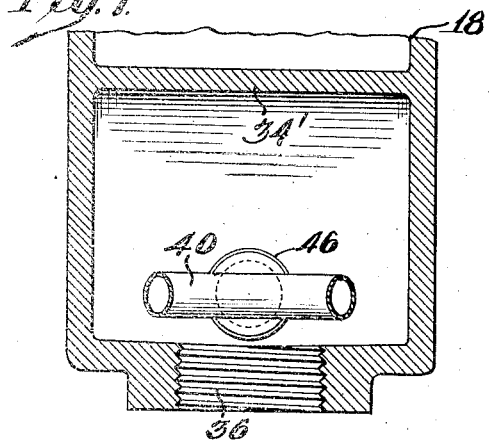
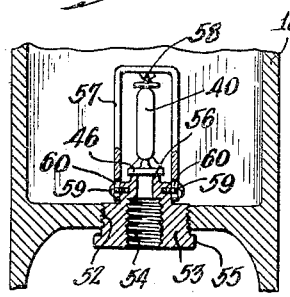
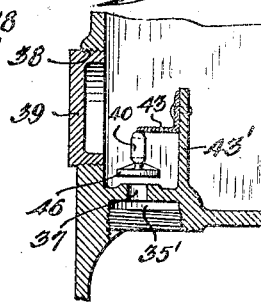
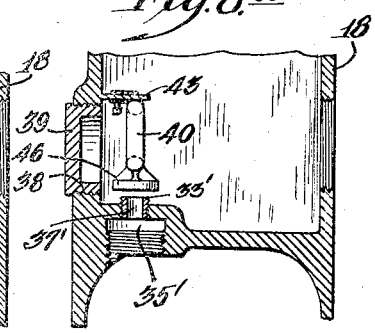
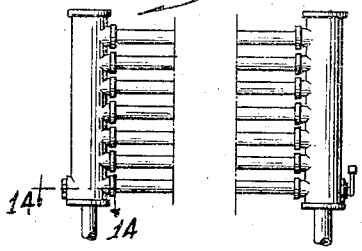
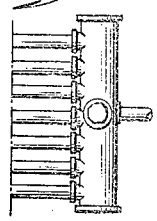
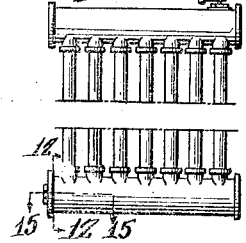
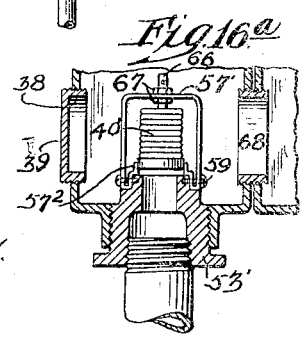
WITNESS:
Walter Chism
INVENTOR
Charles D. Hickman
BY
ATTORNEY Sept. 27, 1927.  
C. D. HICKMAN  
1,643,451  
INTERIOR VALVE FOR RADIATORS  
Filed Feb. 23, 1924     3 Sheets-Sheet 3
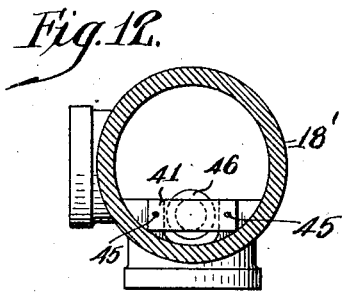
Fig.12.
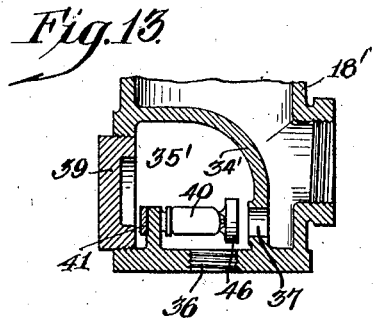
Fig.13.
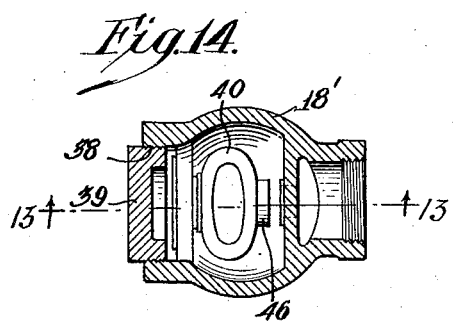
Fig.14.
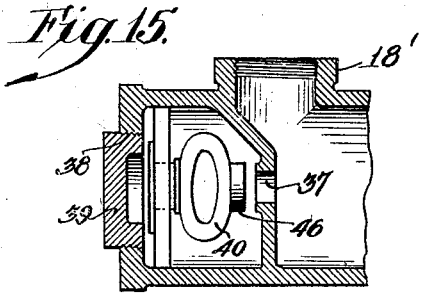
Fig.15.
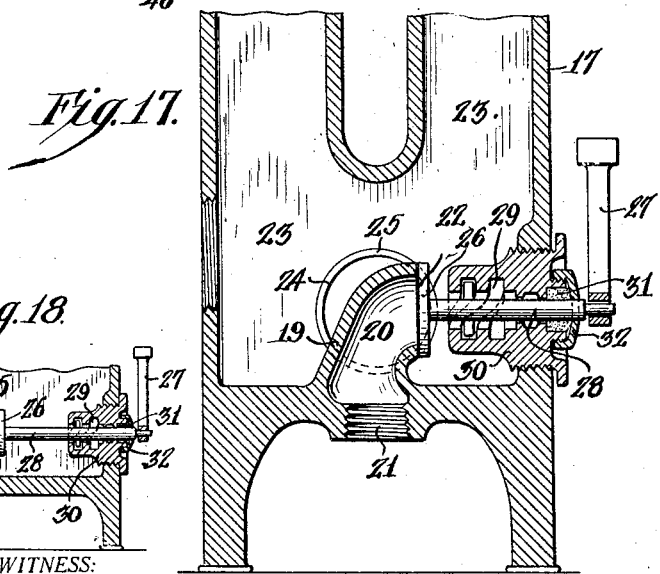
Fig.17.  
Fig.18.
WITNESS:
INVENTOR  
Charles D. Hickman  
BY  
ATTORNEY Patented Sept. 27, 1927.

1,643,451

UNITED STATES PATENT OFFICE.

CHARLES D. HICKMAN, OF PHILADELPHIA, PENNSYLVANIA.

INTERIOR VALVE FOR RADIATORS.

Application filed February 23, 1924. Serial No. 694,457.

My invention relates to radiators and particularly to the placing of the outlet valve for the radiator.

The main purpose of my invention is to locate a thermostatic outlet valve for a radiator preferably within the section of the radiator itself and so that the seat for the thermostatic valve may be within the radiator section and preferably cast integral therewith.

A further purpose is to provide for outlet from a radiator section through a chamber cast into the section itself and relatively quite small as compared with the entire size of the radiator section, the communication between the chamber and the section being through the valve seat closed by the thermostatic valve.

A further purpose is to form an outlet valve seat from a radiator section within the radiator section and at one side or end of a small chamber located within the radiator section, another side or end of the chamber communicating with the outside of the radiator and to place the axis of the valve seat and outlet opening respectively at an angle to each other which is preferably a right angle.

A further purpose is to protect the outlet valve from a radiator section during shipment of the section and also in use by inclusion within the radiator section.

A further purpose is to reduce the cost of manufacture by placing the outlet (thermostatic) radiator valve where it need not be given finish or any decorative appearance.

A further purpose is to form the entire inset valve mechanism, whether inlet or outlet, as an insert or as inserts to the radiator.

Further purposes will appear in the specification and in the claims.

My invention relates both to the apparatus itself and to the methods involved.

I have preferred to illustrate my invention by a few only of the many forms in which it may appear selecting forms which are practical, efficient and highly effective and which at the same time well illustrate the principles involved.

Figure 1 is a side elevation of a radiator embodying my invention.

Figure 2 is a right end elevation of the structure seen in Figure 1.

Figure 3 is a section upon line 3—3 of Figure 1.

Figure 3$^a$ shows the structure of Figure 3 modified in a minor detail.

Figure 4 is a fregmentary vertical section of a thermostatic valve and valve element different slightly from Figure 3.

Figures 5, 6 and 7 are fragmentary sections of Figure 4 taken upon lines 5—5, 6—6 and 7—7.

Figures 8 and 8$^a$ are sections corresponding generally to Figure 4 showing further modified forms.

Figure 9 shows in side elevation my invention as applied to branch T's or manifolds used with pipe coil radiators.

Figure 10 is a fragmentary side elevation of my invention illustrating an outlet near the middle of the manifold.

Figure 11 is a top plan view illustrating my invention in the manifolds with pipe coil radiators, in this instance intended for ceiling use.

Figure 12 is a fragmentary section of Figure 11 taken along the line 12—12 and to enlarged scale.

Figure 13 is a section upon line 13—13 of Figure 14.

Figure 14 is a section upon line 14—14 upon a large scale through the thermostatic valve of Figure 9 to enlarged scale.

Figure 15 is a detail section to enlarged scale taken upon the line 15—15 of Figure 11.

Figures 16 and 16$^a$ are broken vertical sections showing the thermostatic valve and seat as wholly removable.

Figure 17 is a broken section to enlarged scale of Figure 1, upon line 17—17.

Figure 18 shows a broken section, a modification of Figure 17.

In the drawings similar numerals indicate like parts.

Though my invention relates primarily to the outlet valves which are most desirably thermostatic valves I have illustrated it in several figures in conjunction with a radiator which is supplied with an inset inlet valve and the combinations between any specific feature of the inlet valve and the outlet valve generically is intended to be claimed by me in my application for patent Serial No. 579,926, filed August 5, 1922, of which this application is intended to be a continuation in part and the combination between the two herein are therefore distinguished from those of my parent application.

Effort has been made in the specification to indicate that my invention is suited to a great variety of radiators, though I have shown the invention in a few standard types only.

Prior to my invention it has been usual to supply radiators with thermostatic outlet valves to allow passage of condensate without unduly wasting steam. However, the inlet and thermostatic outlet valve have been made external of the radiator with the result that they occupy considerable space making them unnecessarily in the way and may not be shipped as a unit with the radiator without danger of being broken or injured in transit. When shipped separate from the radiator they must be installed after the radiator has been set up and when installed are subject to accident by reason of exposure. They moreover include exposed parts that are unnecessary as compared with my system and the parts exposed to view require suitable and expensive finishing.

I have discovered that the parts can be seated within the radiator section desirably cooperating with a compartment of said section making a smaller and better appearing radiator at a lower cost for construction and with much less installation expense.

In the form of radiators shown in Figures 1 and 2, the radiator 15 is shown as made up of intermediate like sections 16, an inlet section 17 and an outlet section 18. The inlet section (Figure 17) is provided with walls 19 forming a compartment 20 preferably having the axis of the connection 21 by which the inlet pipe is joined to the radiator at an angle to the axis of the valve seat 22 through which the inlet fluid passes to the main interior portion 23 of the radiator. A connection 24 is shown by which the section is united to the next adjoining section preferably by a short-threaded pipe 25.

The valve 26 is operated by any suitable means for which in the illustration I show foot lever 27, stem 28 and a quick thread 29 engaging within a corresponding thread in a plug 30 secured in the side or end of the radiator and suitably packed at 31, 32.

The outlet valve is shown as a thermostatic valve of which one form appears in Figures 3 and 3ª. Here a valve seat 33 is formed in the wall 34 of a compartment 35 between it and the threaded connection 36 for the outlet pipe, the axes of the valve seat and outlet pipe connection being preferably at an angle to each other and most desirably at a right angle to each other.

By the use of the compartment I make it possible to present the valve seat in the most convenient and desirable location and position facing either the side or end of the radiator section where the seat may be conveniently accessible for facing and for the machining of the opening 37 if desired, as by an opening 38 closed by a plug 39 and where the thermostatic element may also be most conveniently placed, adjusted if desired, and kept track of.

The thermostatic element 40 is shown as being of a bent tube type which may be elliptical, or of other general contour considered desirable and which is mounted in any suitable way. In the illustration it is carried by a supporting sleeve 41 which is fastened to a bracket 42 by sliding it down over the top of the bracket. The bracket 42 may be integral with the casting 18 as shown in Figure 3 or as in Figure 3ª, comprise a threaded pin secured to the bottom of the section.

Adjustment may be made toward and from the valve seat by the use of straight or tapered washers of different thickness at 43, 44 or by a set screw 45 or by both; and its height upon the bracket 42 may be altered as desired.

On the side of the thermostatic element toward the valve seat I pivot a valve 46 (from the side of the thermostatic element) by a pin 47 passing through ears 48 which are secured respectively to the valve and to the thermostatic element. The valve is held normally in predetermined vertical position by springs 49 secured to one of the parts, preferably the thermostatic element, and pressing against the other part leaving the valve free to adjust slightly to the valve seat in closing.

The thermostat element may be of various forms of which a well recognized form comprises a sealed and curved metal tube containing a volatile fluid such as alcohol, ether, carbon tetrachloride, etc. The tube is preferaby elliptical in both cross and longitudinal sections. On account of the shortness of the space available to get a maximum advantage the minor axes of both ellipses may lie substantially within the axis of the valve seat.

Referring to the form of Figure 3, it is obvious that if desired both valve-outlet 37, and thermostatic valve element 40 supported upon bracket 43 might be placed vertically. This is illustrated in Figures 8 and 8ª. The bracket 43 is now horizontal. In Figure 8 it is shown as carried by a vertical bracket 43′ preferably integral with the section, while in Figure 8ª the bracket 43 is itself preferably an integral portion of the radiator section. The valve seat may in most of the forms conveniently comprise the end 33′ of a nipple 37′, as shown in Figure 8ª.

In Figure 3 the structure is intended for connection of the outlet pipe through the bottom of the radiator. Obviously the outlet could be through the side or end and with access conveniently located in the end or side.

In either event the thermostat should lie close to the bottom.

In Figure 4 the boss 50 presenting tie rod opening 51 indicates a vertical section, however, the outlet threaded opening 36 might be in the bottom, end or side and the opening 38 for access and its plug 39 in the end or side for a bottom outlet, in the end for a side outlet or in the side for an end outlet.

In Figures 5, 6 and 7, sections of Figure 4 the positions of the parts are also equally suitable for bottom, side or end outlet connection with corresponding side or end, end or side access respectively.

Except for a somewhat different way of supporting the thermostatic element, the form of thermostat and relation of the parts is generally the same in these Figures 4–7 as in Figure 3 with the exception that the thermostat in these Figures 4–7 is placed within the compartment 35' and the access opening 38 opens into the compartment instead of into the main part of the radiator section. For the same reason the wall 34' forming the section is differently formed to provide the correspondingly larger dimension for the access opening. The supporting member 41' of the thermostatic valve is here shown of T form (best seen in Fig. 6) and is screwed to the brackets 42', any requisite slight adjustment being by washers 43².

These different types, having the thermostat within the main radiator section and within the compartment respectively have been shown to indicate that my invention is suitable for either form of mounting and without any intention of suggesting that the two forms of thermostat location are or are not equally advantageous. Likewise in showing adjustment of the thermostatic valve toward and from the valve seat, I have no intention of entering into the contention as to the desirability of supplying adjustable thermostats as compared with those that are fixed.

Figures 9, 10 and 11 are shown for the purpose of indicating the application and placing of the thermostatic valve in these figures.

The valves and connections of Figures 11–15 are of the same character as those shown in Figures 4–7 with the thermostat within the compartment except as the sizes and shapes of the compartment and connections of the several parts have been modified to suit the space available in the constructions shown, it being obvious that my invention relates to the placing of the thermostat within the radiator and to the placing of the outlet valve seat of whatever character within the radiator section, (whatever its exact location there) whether the additional advantage of accessibility by use of the compartment within the radiator section be secured or not.

In Figure 16 the radiator section 18 has a bottom threaded aperture 52 within which is screwed a hollow plug 53 which in turn is apertured and pipe threaded at 54 to reecive the outlet steam pipe. The outside is hexed at 55.

The opening in the plug 53 at its inner end is reduced and terminates in a valve seat 56 adapted to be closed by thermostatically operated valve 46. Any suitable thermostat 40 is sustained in operative relation to the valve by a bracket 57 and mount 58. The bracket is fastened to the plug in any suitable way as by screws 59.

As thus arranged the entire thermostatic operating mechanism is made up separately from the radiator section, but when screwed to place is out of the way within the section, presenting the advantages of location and protection within the radiator possessed by my other thermostatic valve constructions. At the same time it is fully accessible for repairs by removal from the radiator. Moreover, any of the refinements and adjustments desired by some architects and engineers may be applied to it. I have shown an adjustment at 60 which comprises slotting the openings through which the screws 59 pass so that the bracket can be mounted upon the plug to give different distances of normal spacing between the thermostat and the valve seat.

Another form of the thermostatic valve insert seen in Figure 16 is shown in Figure 16ª where plug 53' for the outlet water carries a bracket 57' upon which is mounted a bellows thermostat 40' such as the well known sylphon type, which operates the valve. The bellows has the distinct advantage of requiring but little lateral extension, whereas, in Figure 16 the minor axis of the thermostat would have to be short enough for the thermostat to be inserted within the opening, either directly or when the insert is turned at an angle.

The bracket is held in place by screws 59 and guides the valve by reversely bent entensions 57². The bellows is supported from the bracket by a bolt 66 which is apertured at the upper end, preferably in two directions so as to permit adjustment through the opening 38 normally closed by a plug 39. The bolt 66 is desirably threaded into the bracket and is held in place by lock nuts 67 which must be released for the adjustment.

In this figure the usual connection with the next adjoining section is shown, namely by a threaded sleeve 68.

In Figure 18 I have shown a construction corresponding generally to Figure 17 but with the difference that the threaded opening 21 is for the inlet pipe is formed in a plug 61 screwed into an opening 62 in a boss 63. The plug is hexed at 64. The opening in the plug is reduced in diameter at 65 and terminates in a valve seat against which valve 26 engages. The plug and valve stem must together have sufficient length for the valve and seat to cooperate. The division of this length between the two becomes relatively immaterial.

It will be evident that the forms shown as in Figures 3, 4, 5, 6, 7, 13, 14 and 15 have some advantage in the size and character of compartment formed and the placing of the thermostatic element within the compartment, in that better cooling of the thermostat is provided for, without waiting for the lower part of the section to fill so fully with cooled water. On the other hand other forms have advantages in simplicity and cheapness.

It will further be obvious that changes of many kinds may be made in the character of thermostat used, the relative location of the parts, the shape and placing of the valve seat within the compartment where a compartment is used, and the type of valve, thermostat or otherwise to secure a part or all of the benefit of my invention disclosed herein without copying it, and it is my purpose therefore to include herein all such as come within the reasonable spirit and scope of my invention.

Having thus described my invention, what I claim as new and desire to secure by Letters Patent is:—

1. In a radiator, a radiator section having an outlet, walls about the outlet forming a compartment and having a valve-seated opening between the compartment and the interior of the radiator section, and a thermostatic valve mounted within the compartment to close against and open from the valve seat.

2. In a radiator, a radiator section having an outlet opening, walls forming a small compartment within the section adjacent the opening and in fluid communication with the section, a valve seat between the compartment and the interior of the section, and a valve therefor within the radiator.

3. In a radiator, a radiator section having an outlet, walls about the outlet forming a compartment and having a valve-seated opening between the compartment and the interior of the radiator section, the axis of the opening being perpendicular to the outlet, and a thermostatic valve mounted within the compartment to close against and open from the valve seat.

4. In a radiator, a radiator section having an outlet opening, walls integral with the section forming a small compartment adjacent the opening and in fluid communication with the section, a valve seat between the compartment and the interior of the section, and a valve therefor within the radiator.

5. In a radiator, a radiator section having an outlet opening, walls forming a small compartment within the section adjacent the opening and in fluid communication with the section, a valve seat between the compartment and the interior of the section and axially at an angle with the opening, and a valve therefor within the radiator.

6. In a radiator, a radiator section having an outlet opening, walls forming a small compartment within the section adjacent the opening and having fluid communication with the section by a passage and axially perpendicular to the axis of the opening, and a valve for the passage located within the radiator.

7. In a radiator, a radiator section having an outlet opening, a valve seat at the inner end of the opening, a thermostatic valve for the seat within and supported by the section, and a removable plug in a wall of the section near the valve and generally in line with the axis of the valve seat to give access thereto for placement and removal of the valve.

8. In a radiator, a radiator section having an outlet opening, a valve seat at the inner end of the opening axially at an angle with the outlet, a thermostatic valve for the seat within and supported by the section, and a removable plug in a wall of the section near the valve and generally in line with the axis of the valve seat to give access for insertion and removal of the valve.

9. In a radiator, a radiator section having an outlet opening, a valve seat at the inner end of the opening and axially perpendicular to the outlet, a thermostatic valve for the seat within and supported by the section, and a removable plug in a wall of the section near the valve and generally in line with the axis of the valve seat to give access for insertion and removal of the valve.

10. A radiator section having an outlet opening, walls forming a compartment about the opening having a passage communication with the interior of the section, a valve seat about the passage, a support rigid with the section generally in line with the axis of the valve seat and a thermostatic valve mounted upon the support to engage and disengage from the valve seat.

11. A radiator section having an outlet, walls forming a compartment about the outlet and having a passage giving communication from the section to the compartment, a valve seat about the passage, a thermostatic valve operating member mounted within operating distance of said valve seat, and a valve resiliently mounted on said member to adjust to said seat.

CHARLES D. HICKMAN.